US008855862B2

(12) United States Patent
Tashiro

(10) Patent No.: US 8,855,862 B2
(45) Date of Patent: Oct. 7, 2014

(54) VEHICLE STEERING SYSTEM AND LOADING VEHICLE

(75) Inventor: Takashi Tashiro, Kashihara (JP)

(73) Assignee: Jtekt Corporation, Osaka (JP)

( * ) Notice: Subject to any disclaimer, the term of this patent is extended or adjusted under 35 U.S.C. 154(b) by 136 days.

(21) Appl. No.: 13/606,842

(22) Filed: Sep. 7, 2012

(65) Prior Publication Data

US 2013/0073147 A1 Mar. 21, 2013

(30) Foreign Application Priority Data

Sep. 15, 2011 (JP) ................................. 2011-202259

(51) Int. Cl.
*B66F 9/075* (2006.01)
*B62D 6/00* (2006.01)
(52) U.S. Cl.
CPC ............. *B62D 6/008* (2013.01); *B66F 9/07568* (2013.01)
USPC ............................................. 701/42; 180/402
(58) Field of Classification Search
None
See application file for complete search history.

(56) References Cited

U.S. PATENT DOCUMENTS

| 6,929,085 | B2 * | 8/2005 | Sugitani ........................ 180/402 |
| 7,004,278 | B2 * | 2/2006 | Sugitani et al. ............... 180/402 |
| 7,406,374 | B2 * | 7/2008 | Ono et al. ....................... 701/41 |
| 7,698,035 | B2 * | 4/2010 | Chino et al. .................... 701/41 |
| 7,810,605 | B2 * | 10/2010 | Kasahara et al. ............. 180/402 |
| 7,860,624 | B2 * | 12/2010 | Kubota et al. .................... 701/41 |
| 7,900,742 | B2 * | 3/2011 | Kubokawa et al. ........... 180/402 |
| 8,467,939 | B2 * | 6/2013 | Hayama .......................... 701/41 |
| 2008/0249685 | A1 * | 10/2008 | Hara et al. ....................... 701/42 |
| 2010/0147618 | A1 * | 6/2010 | Osonoi et al. ................. 180/403 |

FOREIGN PATENT DOCUMENTS

| EP | 0 854 075 A2 | 7/1998 |
| EP | 1 256 507 A2 | 11/2002 |
| EP | 1 939 072 A1 | 7/2008 |
| JP | A-2010-264833 | 11/2010 |

OTHER PUBLICATIONS

May 27, 2014 Extended Search Report issued in European Patent Application No. 12183641.5.

* cited by examiner

*Primary Examiner* — John R Olszewski
*Assistant Examiner* — James M McPherson
(74) *Attorney, Agent, or Firm* — Oliff PLC

(57) ABSTRACT

A vehicle steering system includes a steering angle detecting unit; a reaction force actuator; and a reaction force actuator control unit. The reaction force actuator control unit determines whether the steering angle detected by the steering angle detecting unit is within a first steering angle range where the steering angle is smaller than or equal to a first change angle or a second steering angle range where the steering angle is larger than the first change angle, and controls the reaction force actuator such that the steering reaction force is increased to a maximum value with an increase in the steering angle when the steering angle is within the first steering angle range and the steering reaction force is monotonically decreased from the maximum value with an increase in the steering angle when the steering angle is within the second steering angle range.

10 Claims, 4 Drawing Sheets

VEHICLE STEERING SYSTEM AND LOADING VEHICLE

INCORPORATION BY REFERENCE

The disclosure of Japanese Patent Application No. 2011-202259 filed on Sep. 15, 2011 including the specification, drawings and abstract, is incorporated herein by reference in its entirety.

BACKGROUND OF THE INVENTION

1. Field of the Invention

The invention relates to a vehicle steering system that is used in a loading vehicle such as a forklift.

2. Description of Related Art

A forklift often turns a corner having an angle close to a right angle. The rear wheels of the forklift serve as steered wheels. Therefore, at the time of turning a corner having an angle close to a right angle, a steering operation specific to the forklift is performed, that is, the front (fork portion) of the forklift is slightly turned in a turning direction at a small steering angle and then the rear of the forklift is caused to swing out toward the outer side of the corner through a quick steering operation. The forklift employs a so-called steer-by-wire power steering system in which a steering member provided in an operator cab and the rear wheels that serve as steered wheels are not mechanically connected to each other. Therefore, there is originally no reaction force applied from the rear wheels to the steering member. Accordingly, in related art, simulated reaction force is created by a device arranged on the steering side and is supplied to an operator.

In addition, a steering ratio, which is a ratio between a steering angle of a steering wheel and a steered angle of steered wheels, is set such that the steering angle and the steered angle are in a proportional relation (see Japanese Patent Application Publication No. 2010-264833 (JP 2010-264833 A).

The steering angle range of a forklift is wide and a steering operation is frequently performed in the forklift, due to the nature of its use. Therefore, an operator needs to operate a steering wheel by a large amount, so a large burden is placed on the operator. Simulated reaction force created by a device arranged on the steering side has such a characteristic that the simulated reaction force increases linearly with an increase in the steering angle until the steering angle reaches a certain value, and is maintained at a constant value after the steering angle reaches the certain value, as shown in the graph of the "characteristic in related art" in FIG. 4. Therefore, in an initial stage of a turn, reaction force is too small and steering force overcomes the reaction force. Accordingly, the steering angle is often larger than a steering angle intended by the operator. In addition, in a late stage of the turn, a quick steering operation needs to be performed. However, large force is required to perform a quick steering operation against the large reaction force. Therefore, a large burden is placed on the operator. This reduces the working efficiency.

SUMMARY OF THE INVENTION

It is an object of the invention to provide a vehicle steering system and a loading vehicle with which a burden that is placed on an operator performing a steering operation is reduced by appropriately setting a characteristic of reaction force with respect to a steering angle.

An aspect of the invention relates to a vehicle steering system that includes: a steered wheel driving mechanism that steers a steered wheel; a steering angle detecting unit that detects a steering angle of a steering member; a reaction force actuator that applies steering reaction force to the steering member; a steered operation actuator that drives the steered wheel driving mechanism; a steered operation actuator control unit that controls the steered operation actuator; a steering range determination unit that determines whether the steering angle is within a first steering angle range where the steering angle is smaller than or equal to a first change angle or within a second steering angle range where the steering angle is larger than the first change angle; and a reaction force actuator control unit that controls the reaction force actuator such that the steering reaction force is increased to a maximum value with an increase in the steering angle when the steering angle is within the first steering angle range and the steering reaction force is decreased from the maximum value with an increase in the steering angle when the steering angle is within the second steering angle range.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
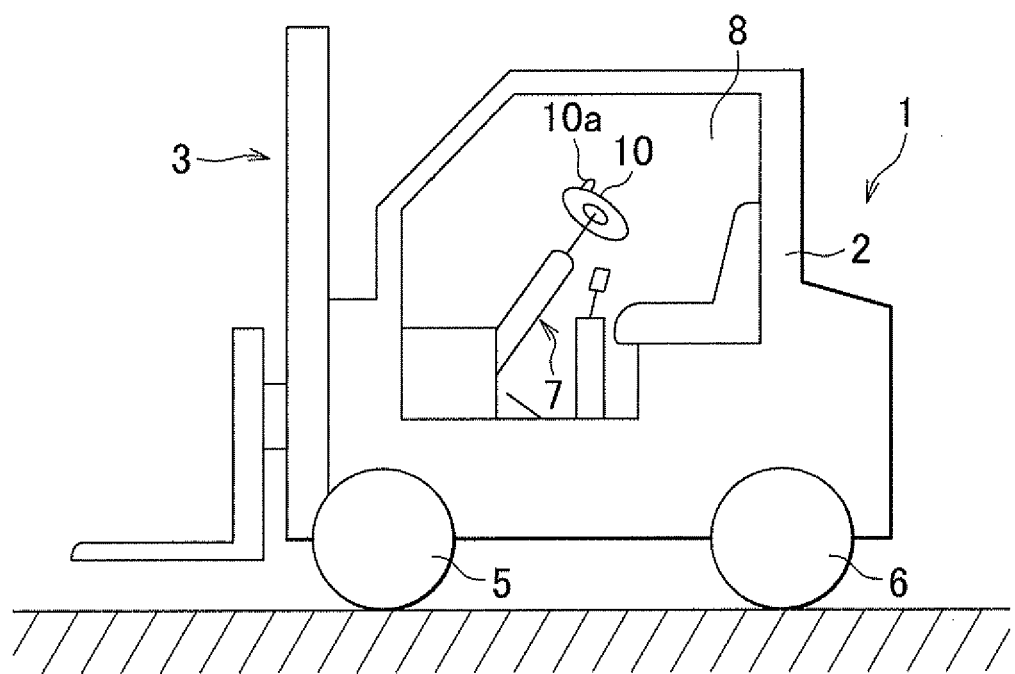
FIG. 1 is a schematic side view that shows the schematic configuration of a forklift.

Hereinafter, an embodiment of the invention will be described in detail with reference to the accompanying drawings. FIG. 1 is a schematic side view that shows the schematic configuration of a forklift 1 that is an example of a loading vehicle according to the invention. The forklift 1 includes a vehicle body 2, a loading device 3, front wheels 5, rear wheels 6, and a vehicle steering system 7. The loading device 3 is provided at the front of the vehicle body 2. The front wheels 5 are drive wheels that support the vehicle body 2. The rear wheels 6 are steered wheels. The vehicle steering system 7 steers the rear wheels 6.

The vehicle steering system 7 is a so-called steer-by-wire power steering system in which a steering member 10 provided in an operator cab 8 and the rear wheels 6, which serve as the steered wheels, are not mechanically connected to each other. In the present embodiment, the steering member 10 is a hand-turned steering wheel with a knob 10a. An operator grasps the knob 10a rotatably provided on the steering wheel, and rotates or stops the steering wheel.

Figure 2:
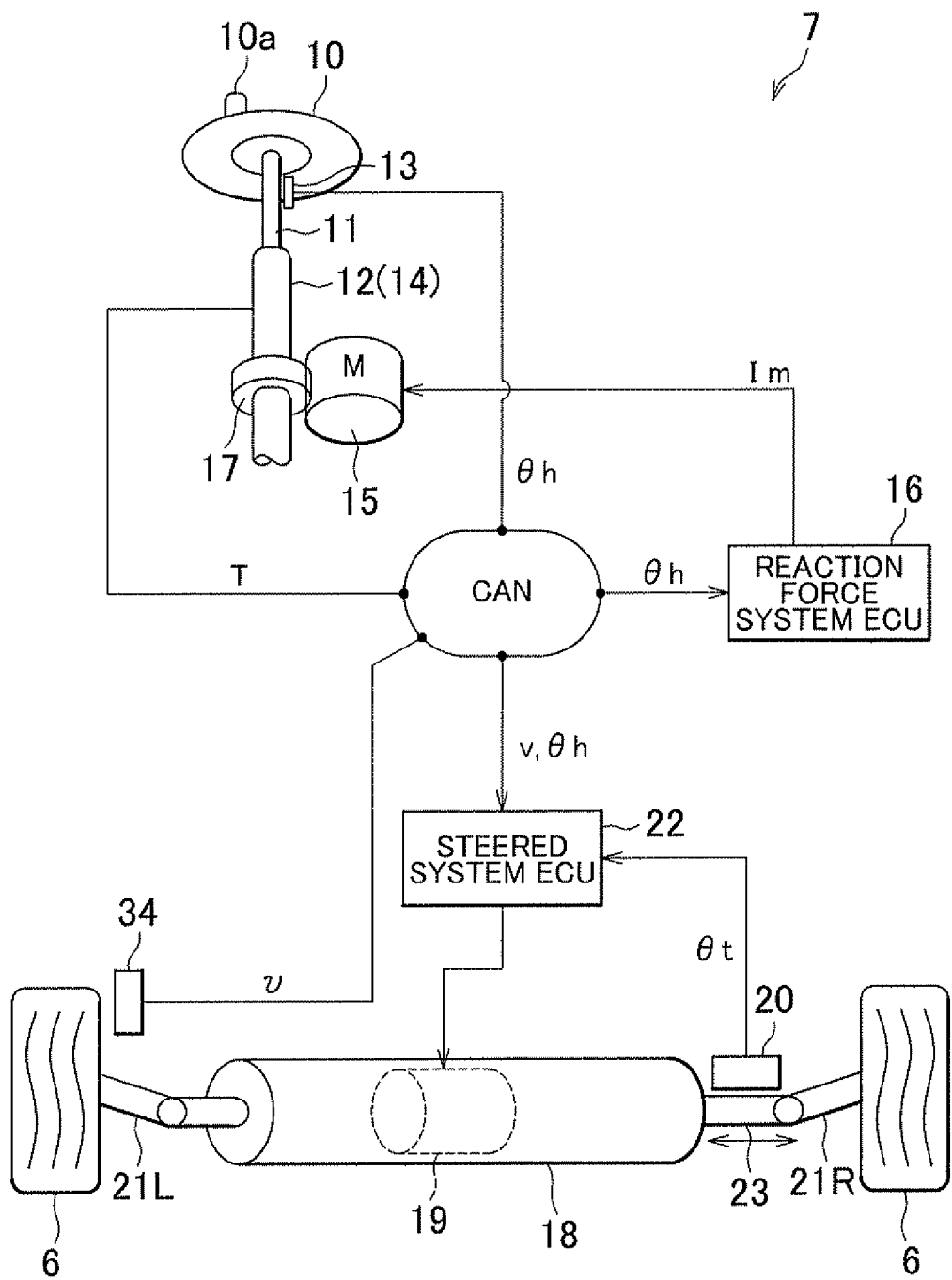
FIG. 2 is a view that shows the overall configuration of a vehicle steering system.

FIG. 2 is a view that shows the overall configuration of the vehicle steering system 7. The vehicle steering system 7 includes a shaft 11, a cylindrical column 12, a steering angle sensor 13, a steering torque sensor 14, a reaction force motor 15, and a reaction force system ECU 16 (electronic control unit). The shaft 11 is coupled to the steering member 10. The shaft 11 is rotatably supported by the column 12. The steering angle sensor 13 detects a steering angle θh of the steering member 10. The steering torque sensor 14 is arranged inside the column 12, and detects a steering torque of the steering member 10. The reaction force motor 15 may function as a reaction force actuator that applies steering reaction force to the steering member 10 via a gear 17. The ECU 16 executes drive control over the reaction force motor 15. The steering torque sensor 14 detects a steering torque by detecting a twisted angle of a torsion bar arranged at a middle portion of the shaft 11. The steering angle sensor 13 detects the rotation angle of the shaft 11 by detecting a magnetism of a magnet, attached to the outer periphery of the shaft 11 of the steering member 10, with the use of a Hall sensor. In the present embodiment, the steering angle sensor 13 detects a rotation angle of the steering member 10 in each of the forward and reverse directions of the steering member 10 from its neutral position. The steering angle sensor 13 outputs a rotation angle in the clockwise direction from the neutral position as a positive value, and outputs a rotation angle in the counter-clockwise direction from the neutral position as a negative value. The reaction force motor 15 is a direct-current motor that is arranged on an axis different from the axis of the shaft 11, and that rotates the shaft 11 at a predetermined gear ratio determined by the gear 17. Note that the reaction force motor 15 may be arranged coaxially with the column 12.

The vehicle steering system 7 is mounted in the vehicle body 2. The vehicle steering system 7 includes a rack shaft 23, a rack support member 18, a steered operation motor 19, a steered system ECU 22, and a steered angle sensor 20. The rack shaft 23 is a steered shaft that extends in the lateral direction of the vehicle. The rack shaft 23 is movably supported by the rack support member 18. The steered operation motor 19 moves the rack shaft 23. The steered system ECU 22 executes drive control over the steered operation motor 19. The steered angle sensor 20 detects a steered position (referred to as "steered angle" in the specification) of the rear wheels 6. The steered operation motor 19 is a direct-current motor that is coaxial with the rack shaft 23 and that is incorporated in the rack support member 18. The rotational motion of the steered operation motor 19 is converted into a reciprocal motion of the rack shaft 23 via a steered gear incorporated in the rack support member 18. The reciprocal motion is transmitted to the rear wheels 6 via tie rods 21R, 21L respectively coupled to a pair of end portions of the rack shaft 23. In this way, the rear wheels 6 are steered. The steered angle sensor 20 detects the displaced position of the rack shaft 23 with the use of a stroke sensor on the basis of the fact that the displaced position of the rack shaft 23 corresponds to the steered angle of the rear wheels 6. In this way, the steered angle of the rear wheels 6 is detected.

In addition, in order to steer the rear wheels 6 in response to an operation of the steering member 10, the reaction force system ECU 16 and the steered system ECU 22 are connected to each other via an in-vehicle LAN (for example, CAN). Furthermore, a wheel speed sensor 34 is attached to a rotor of one of the front wheels 5 or one of the rear wheels 6. The wheel speed sensor 34 detects the rotation speed of the associated wheel. The wheel speed sensor 34 is a sensor that optically reads the rotation speed of the rotor of the wheel, and multiplies the read rotation speed by the effective rotation radius of a corresponding tire. In this way, a vehicle speed v is detected.

The steered system ECU 22 rotates the steered operation motor 19 on the basis of the steering angle detected by the steering angle sensor 13. The rotation of the steered operation motor 19 is converted into a reciprocal motion of the rack shaft 23 via the steered gear. The reciprocal motion is transmitted to the rear wheels 6 via the tie rods 21R, 21L coupled to the respective end portions of the rack shaft 23. In this way, the rear wheels 6 are steered.

Figure 3:
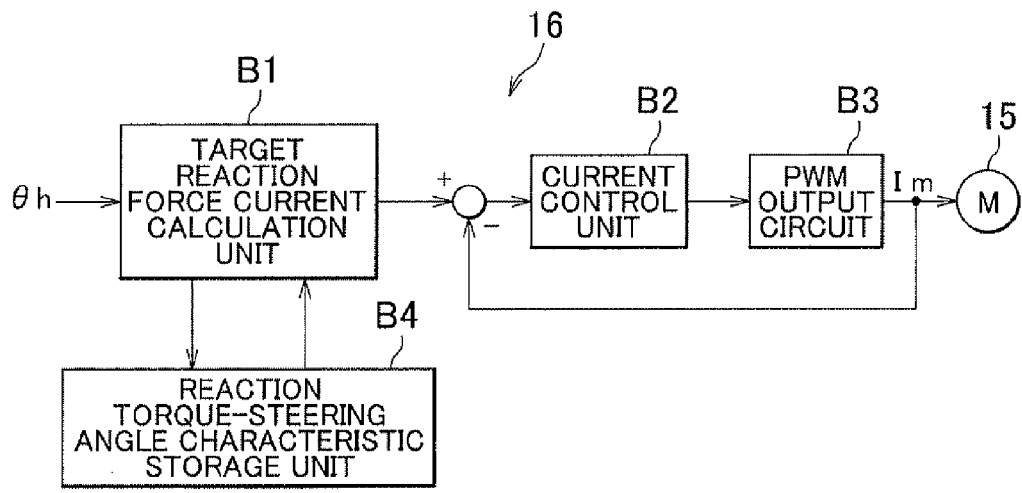
FIG. 3 is a control block diagram for reaction force control executed by a reaction force system ECU.

FIG. 3 shows a block diagram of reaction force control that is executed by the reaction force system ECU 16. A steering angle signal is transmitted from the steering angle sensor 13 to a target reaction force current calculation unit 131 of the reaction force system ECU 16 via the in-vehicle LAN. The steering angle signal indicates the detected steering angle θh.

Figure 4:
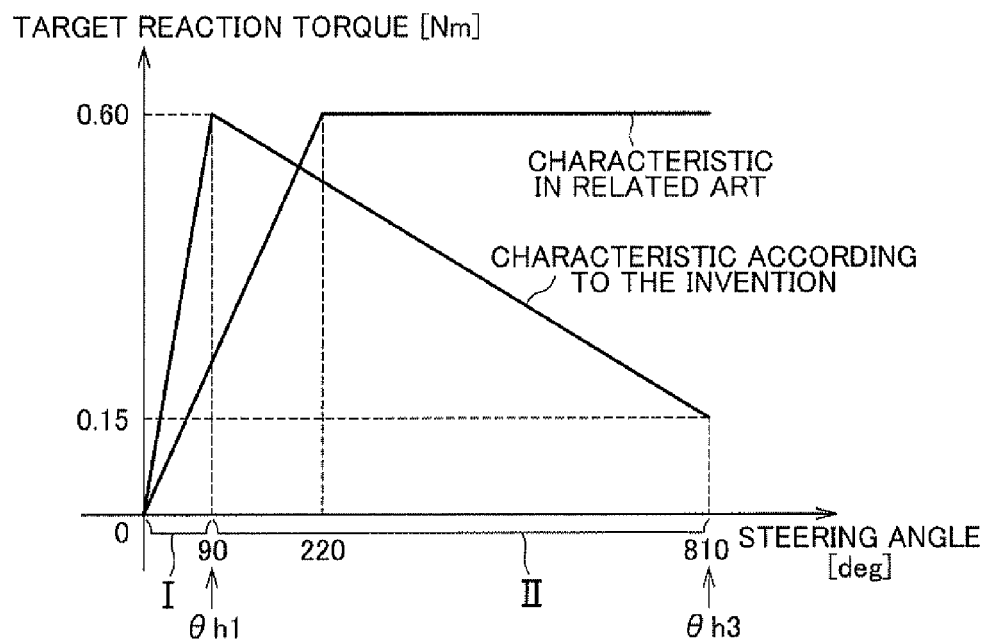
FIG. 4 is a graph that shows the correlation between a steering angle and a target reaction torque, stored in a reaction torque-steering angle characteristic storage unit.

A reaction torque-steering angle characteristic storage unit 134 formed of a nonvolatile memory stores the correlation between a steering angle θh and a target reaction torque as a function. The graph of the "characteristic according to the invention" shown in FIG. 4 shows the correlation between a steering angle θh and a target reaction torque, stored in the reaction torque-steering angle characteristic storage unit B4. As shown in the graph, a first change angle θh1 is set. When the steering angle is within a first steering angle range I where the steering angle is smaller than or equal to the first change angle θh1, the target reaction torque is increased to a maximum value with an increase in steering angle. After the steering angle enters a second steering angle range II where the steering angle is larger than the first change angle θh1, the target reaction torque monotonically decreases from the maximum value with an increase in the steering angle. The target reaction torque takes a minimum value within the second steering angle range II when the steering angle is at an upper limit steering angle θh3. Note that the "upper limit steering angle θh3" is an angle at which it is not possible to rotate the steering member 10 any more.

The first change angle θh1 is set to a steering angle of, for example, 90 degrees. The upper limit steering angle θh3 is set to, for example, 810 degrees. The target reaction torque takes a maximum value of 0.6 Nm when the steering angle is at the 90 degrees that is the first change angle θh1, and takes a minimum value of 0.15 Nm when the steering angle is at the upper limit steering angle of 810 degrees. On the basis of the correlation between a steering angle (described later) and a steered angle of the rear wheels 6 (see the graph of the "characteristic according to the invention" in FIG. 6), a steering angle of 90 degrees is converted into a steered angle of 8 degrees. The upper limit steering angle of 810 degrees is converted into a steered angle of 75 degrees.

In the present embodiment, the first change angle θh1 is set to a tire steered angle of 8 degrees. However, the first change angle θh1 is not limited to 8 degrees. The first change angle θh1 needs to be selected with reference to a steering angle achieved in the initial stage of a turn, and may be selected from, for example, a range of 5 to 15 degrees in the tire steered angle. Particularly, it is desirable that the first change angle θh1 be selected from a range of 8 to 10 degrees. The target reaction force current calculation unit B1 converts the steering angle θh to a target reaction force current on the basis of the above-described correlation between the steering angle θh and the target reaction torque. The target reaction force current is input into a current control unit B2. Meanwhile, a current Im that flows through the reaction force motor 15 is detected, and its inverted signal is input into the current control unit B2. A difference between the target reaction force current and the current Im that flows through the reaction force motor 15 is calculated in the current unit B2. The difference is supplied to a PWM output circuit B3, and a PWM drive signal for driving the reaction force motor 15 is generated. Then, by supplying the PWM drive signal to the reaction force motor 15, reaction torque is applied to the steering member 10 via the reaction force motor 15, the gear 17 and the shaft 11.

Figure 5:
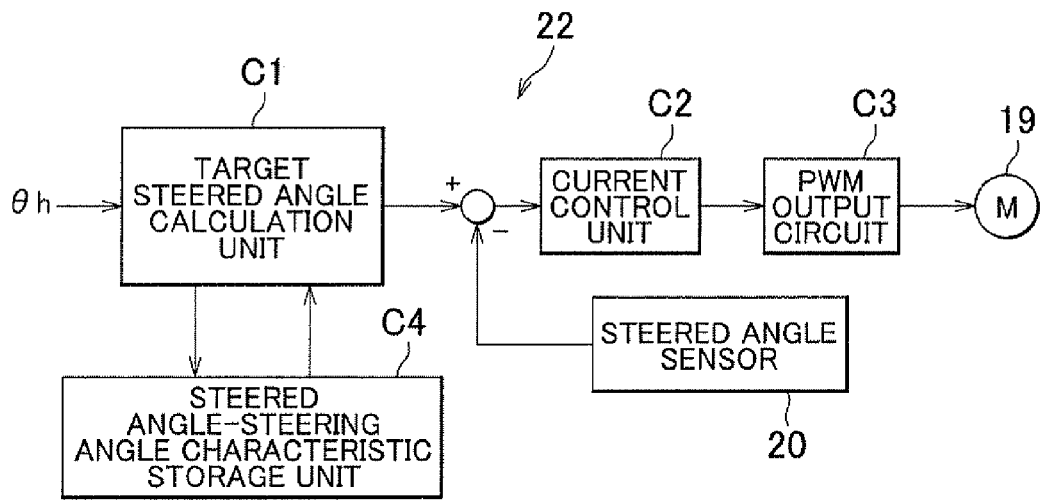
FIG. 5 is a block diagram of steered control executed by a steered system ECU.

Next, FIG. 5 shows a block diagram of steered control that is executed by the steered system ECU 22. A steering angle signal is transmitted from the steering angle sensor 13 to a target steered angle calculation unit C1 of the steered system ECU 22 via the in-vehicle LAN. The steering angle signal indicates the detected steering angle θh. A steered angle-steering angle characteristic storage unit C4 formed of a nonvolatile memory stores the correlation between the steering angle θh and the target steered angle as a function.

Figure 6:
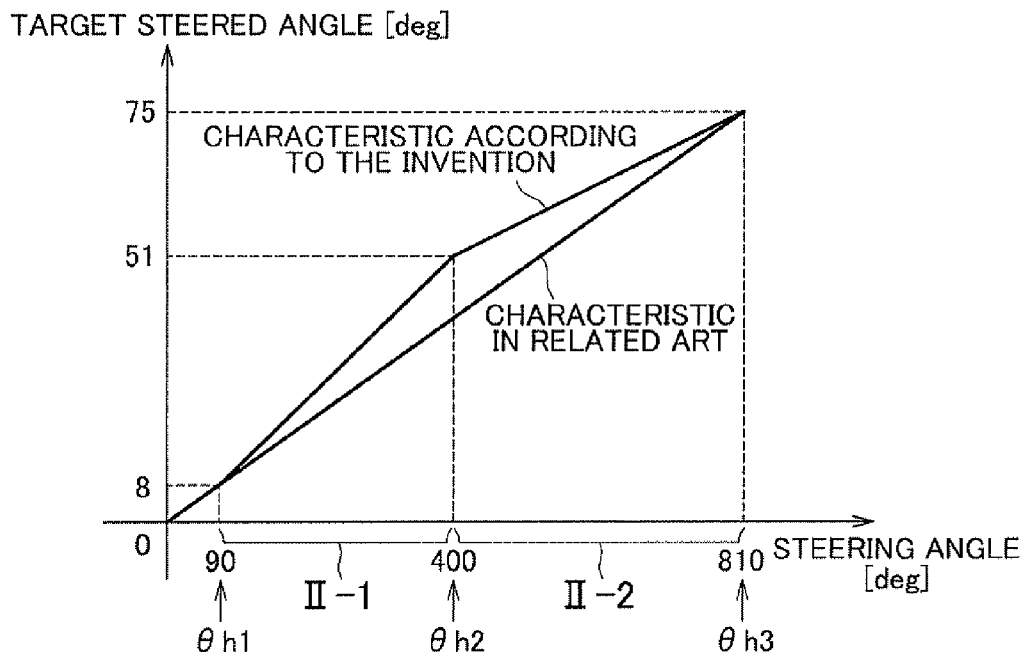
FIG. 6 is a graph that shows the correlation (steering ratio) between a steering angle and a target steered angle, stored in a steered angle-steering angle characteristic storage unit.

FIG. 6 shows the correlation (steering ratio) between the steering angle θh and the target steered angle, stored in the steered angle-steering angle characteristic storage unit C4. As shown in the graph, a second change angle θh2 that is larger than the first change angle θh1 and smaller than the upper limit steering angle θh3 is set. The slope of the line that indicates the ratio of the steered angle to the steering angle is a first slope when the steering angle is within a steering angle range II-1 from the first change angle θh1 to the second change angle θh2. The slope of the line that indicates the ratio of the steered angle to the steering angle is a second slope that is more moderate than the first slope in a steering angle range II-2 from the second change angle θh2 to the upper limit steering angle θh3. That is, when the slope (characteristic in related art) of the straight line that connects the steered angle at the first change angle θh1 to the steered angle at the upper limit steering angle θh3 is "third slope", the inequality that first slope>third slope>second slope holds.

The second change angle θh2 is set to, for example, a steering angle of 400 degrees. A steering angle of 400 degrees is converted into a target steered angle of 51 degrees. Note that, in the present embodiment, the second change angle θh2 is set to a tire steered angle of 51 degrees. However, the second change angle θh2 is not limited to 51 degrees. The second change angle θh2 may be selected from the range between the first change angle θh1 and the upper limit steering angle. If the second change angle θh2 is set in this way, at the time of loading or unloading a cargo (loading work) after the forklift turns a right-angle corner, the steering angle at the time when the forklift 1 stops in front of the cargo falls within the range II-2. Therefore, when a minute lateral adjustment steering operation of fork distal ends (steering or reverse steering operation) at the time of starting loading work is performed while the steering angle is within the range II-2, the steering ratio is low. Therefore, it is possible to easily perform work.

Note that the steering ratio may be set on the basis of the vehicle speed v. More specifically, the steering ratio may be reduced over the entire range as the vehicle speed v increases, and the steering ratio may be increased over the entire range as the vehicle speed v decreases. The target steered angle calculation unit C1 converts the steering angle θh into a target steered angle on the basis of the above-described correlation between the steering angle θh and the target steered angle. A signal that indicates the target steered angle is input into a current control unit C2. Meanwhile, the steered angle of the rear wheels 6 is detected by the steered angle sensor 20, and its inverted signal is input into the current control unit C2. A difference between the target steered angle and the detected steered angle of the rear wheels 6 is calculated in the current control unit C2. The difference is supplied to a PWM output circuit C3, and a PWM drive signal for driving the steered operation motor 19 is generated. Then, by supplying the PWM drive signal to the steered operation motor 19, the rotation is converted into a parallel motion of the rack shaft 23. The parallel motion is transmitted to the rear wheels 6 via the tie rods 21R, 21L. In this way, the rear wheels 6 are steered.

As described above, according to the embodiment of the invention, the operator of the forklift 1 starts rotating the steering member 10 in the initial stage of a turn of the vehicle, that is, when the steering angle is within the first steering angle range I, and steers the forklift 1 while feeling large steering reaction force until the steering angle reaches the first change angle θh1 therefore, it is less likely to excessively rotate the steering member 10 despite the operator's intention that the front of the forklift 1 is slightly turned in a turning direction at a small steering angle. Then, in the later stage of the turn, the steering angle falls within the second steering angle range II that is above the first change angle θh1. At this time, the steering reaction force monotonically decreases from the maximum value with an increase in the steering angle. Therefore, the operator feels a reduction in reaction force as the operator rotates the steering member 10. Therefore, the operator is able to easily cause the rear of the forklift 1 to swing out by rotating the steering member 10 with a smaller force.

In addition, it is possible to steer the forklift 1 at a high ratio when the steering angle is in the first-half steering angle range II-1 of the second steering angle range II, and it is possible to steer the forklift 1 at a low ratio when the steering angle is in the second-half steering angle range II-2. Therefore, in comparison with the steering ratio in the related art, which is indicated by the straight line that connects the steered angle at the first change angle θh1 to the steered angle at the upper limit steering angle θh3, it is possible to turn the forklift 1 by a large amount only by slightly rotating the steering member 10 when the steering angle is in the first-half steering angle range II-1 where the steering reaction force is still relatively large although it becomes smaller than the maximum value. In the second-half steering angle range II-2 where the steering reaction force is further decreased, the steering member 10 needs to be rotated by a larger amount. However, the steering reaction force is decreased, so a burden that is placed on the operator is small. In addition, when loading work is performed while the steering angle is in the range II-2, the steering ratio is low. Therefore, it is easy to perform positioning of the fork distal ends.

By setting the steering reaction force on the basis of a steering angle and setting the steering ratio on the basis of a steering angle as described above, the operator easily performs a quick steering operation with a small force. Therefore, it is possible to reduce a burden that is placed on the operator who performs a steering operation.

The embodiment of the invention has been described above. However, the embodiment of the invention is not limited to the above-described embodiment. For example, instead of providing the rear wheels 6 at the right and left sides of the vehicle body 2 as the steered wheels, a single rear wheel 6 may be provided at the center in the lateral direction of the vehicle body 2 as a steered wheel. In addition, in the above-described embodiment, the rack shaft 23 that is driven by the steered operation motor 19 is employed as a steered wheel driving mechanism. Alternatively, a hydraulic cylinder that is driven by an electric hydraulic pump may be employed. Further alternatively, various modifications may be made within the scope of the invention.

What is claimed is:

1. A vehicle steering system, comprising:
 a steered wheel driving mechanism that steers a steered wheel;

a steering angle detecting unit that detects a steering angle of a steering member;

a reaction force actuator that applies steering reaction force to the steering member;

a steered operation actuator that drives the steered wheel driving mechanism;

a steered operation actuator control unit that controls the steered operation actuator;

a steering range determination unit that determines whether the steering angle is within a first steering angle range where the steering angle is smaller than or equal to a first change angle or within a second steering angle range where the steering angle is larger than the first change angle; and a reaction force actuator control unit that controls the reaction force actuator such that the steering reaction force is increased to a maximum value with an increase in the steering angle when the steering angle is within the first steering angle range and the steering reaction force is decreased from the maximum value with an increase in the steering angle when the steering angle is within the second steering angle range.

2. The vehicle steering system according to claim 1, wherein a second change angle that is larger than the first change angle is set, and the steered operation actuator control unit controls the steered operation actuator such that a ratio of a steered angle to a steering angle takes a first slope when the steering angle is within a range from the first change angle to the second change angle and takes a second slope that is more moderate than the first slope when the steering angle is larger than or equal to the second change angle.

3. The vehicle steering system according to claim 1, wherein the first change angle is selected from a range from 5 to 15 degrees in the steered angle of the steered wheel.

4. The vehicle steering system according to claim 2, wherein the first change angle is selected from a range from 5 to 15 degrees in the steered angle of the steered wheel.

5. The vehicle steering system according to claim 3, wherein the first change angle is selected from a range from 8 to 10 degrees in the steered angle of the steered wheel.

6. The vehicle steering system according to claim 4, wherein the first change angle is selected from a range from 8 to 10 degrees in the steered angle of the steered wheel.

7. The vehicle steering system according to claim 1, wherein a steer-by-wire system in which the steering member and the steered wheel driving mechanism are not mechanically connected to each other is employed.

8. The vehicle steering system according to claim 2, wherein a steer-by-wire system in which the steering member and the steered wheel driving mechanism are not mechanically connected to each other is employed.

9. A loading vehicle, comprising the vehicle steering system according to claim 1.

10. A loading vehicle, comprising the vehicle steering system according to claim 2.

* * * * *